(12) United States Patent
Smith et al.

(10) Patent No.: US 10,373,411 B2
(45) Date of Patent: Aug. 6, 2019

(54) REGULATING ACCESS TO ELECTRONIC ENTERTAINMENT TO INCENTIVIZE DESIRED BEHAVIOR

(71) Applicants: AT&T Intellectual Property I, L.P., Atlanta, GA (US); AT&T Mobility II LLC, Atlanta, GA (US)

(72) Inventors: Tyler Smith, Dallas, TX (US); Douglas Cooper, Richardson, TX (US); Israel Smallwood, Dallas, TX (US); Josephine Demuth, Atlanta, GA (US); Paul Wolf, Dallas, TX (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/613,735

(22) Filed: Jun. 5, 2017

(65) Prior Publication Data
US 2018/0350173 A1 Dec. 6, 2018

(51) Int. Cl.
 G05B 19/00 (2006.01)
 G07C 9/00 (2006.01)
(52) U.S. Cl.
 CPC ................ *G07C 9/00126* (2013.01)
(58) Field of Classification Search
 CPC ............................................. G07C 9/00126
 USPC ............ 340/5.51, 5.22, 5.26, 5.6, 5.82, 5.4
 See application file for complete search history.

(56) References Cited

U.S. PATENT DOCUMENTS

| | | | |
|---|---|---|---|
| 8,010,037 B2 | 8/2011 | Bannwolf et al. | |
| 8,483,738 B2 | 7/2013 | Kemery et al. | |
| 9,489,531 B2 | 11/2016 | Weiss | |
| 2005/0143175 A1 | 6/2005 | Ahlquist | |
| 2009/0038005 A1 | 2/2009 | Howarth | |
| 2012/0123835 A1* | 5/2012 | Chu ................ | G06Q 10/06375 705/14.12 |
| 2012/0215328 A1* | 8/2012 | Schmelzer .......... | G06F 19/3481 700/91 |
| 2013/0090213 A1 | 4/2013 | Amini et al. | |
| 2014/0337244 A1 | 11/2014 | Lotvin et al. | |
| 2015/0079577 A1* | 3/2015 | Teitelbaum .............. | G09B 7/00 434/353 |
| 2016/0330078 A1* | 11/2016 | Bostick ................... | H04W 4/21 |
| 2016/0330578 A1* | 11/2016 | Moussavian ............ | H04L 43/08 |
| 2016/0335424 A1 | 11/2016 | Hampson et al. | |
| 2017/0281119 A1* | 10/2017 | Stroman ................. | A61B 7/04 |

\* cited by examiner

*Primary Examiner* — Dhaval V Patel

(57) ABSTRACT

In one example, the present disclosure describes a device, computer-readable medium, and method for regulating access to electronic entertainment to incentivize desired behavior. For instance, in one example, the behavior of an individual is monitored through data received from an electronic device. The behavior is compared to a predefined behavioral goal stored in a profile for the individual, and a predefined incentive associated with satisfaction of the predefined behavioral goal by the user is identified. The predefined incentive comprises access to an electronic entertainment medium. An instruction to the electronic entertainment medium is generated to grant access to the individual when it is determined that the individual has satisfied the predefined behavioral goal.

20 Claims, 5 Drawing Sheets

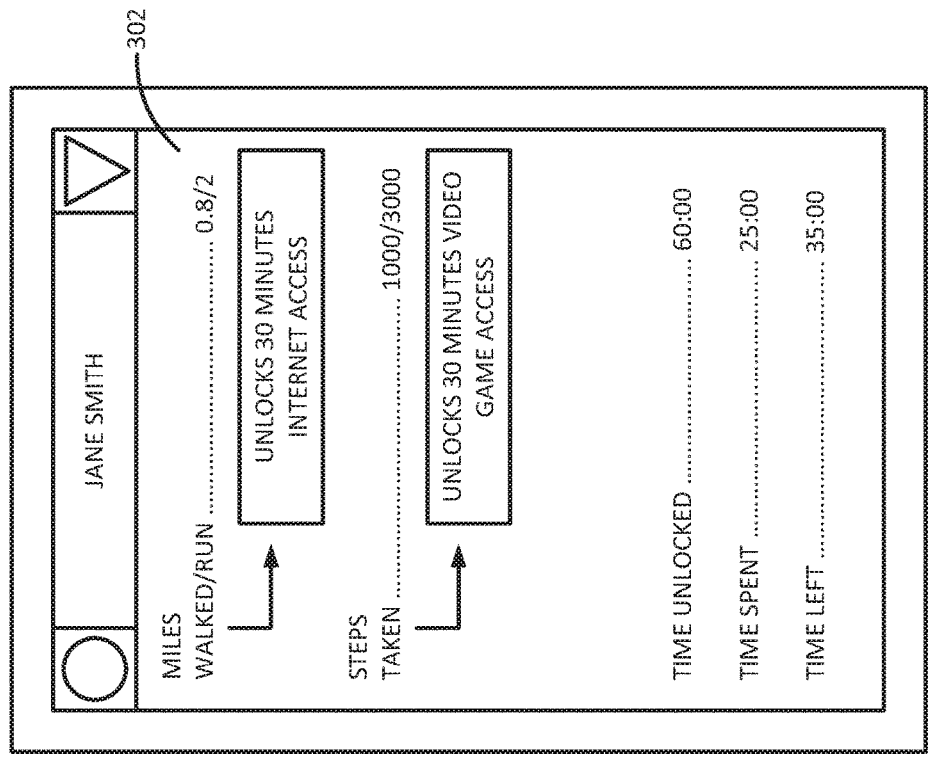
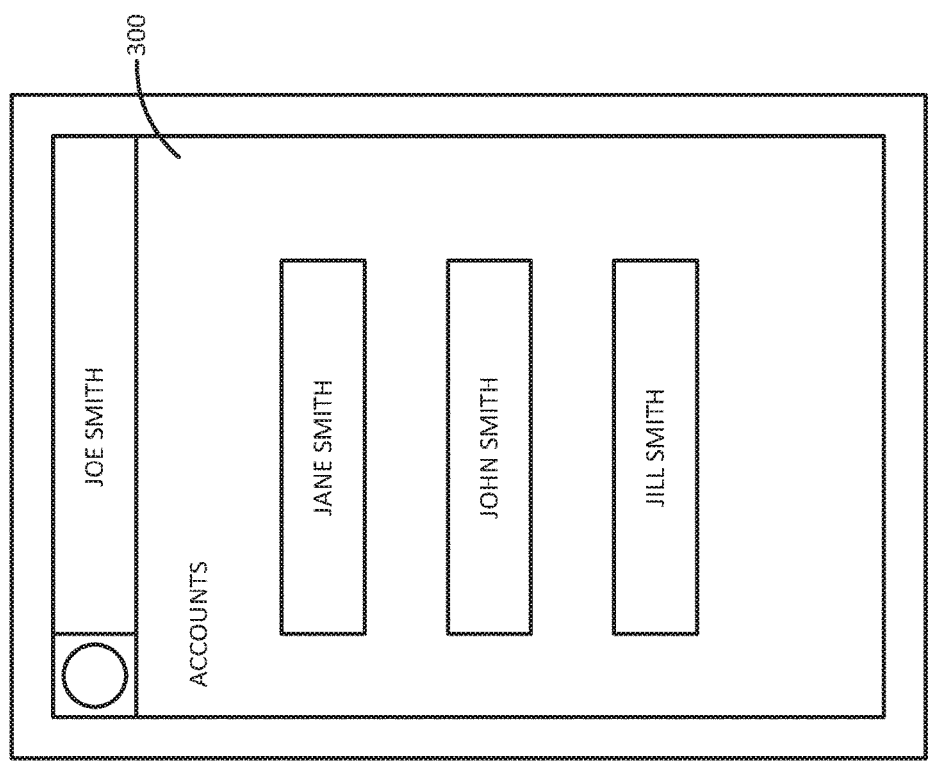
FIG. 3B
FIG. 3A

REGULATING ACCESS TO ELECTRONIC ENTERTAINMENT TO INCENTIVIZE DESIRED BEHAVIOR

The present disclosure relates generally to electronic entertainment, and relates more particularly to devices, non-transitory computer-readable media, and methods for regulating access to electronic entertainment to incentivize desired behavior, such as physical activity, safe driving habits, or the like

BACKGROUND

Obesity in children has become a growing concern in recent years. For instance, the World Health Organization estimates that the rates of obesity in children have tripled during the last twenty years.

SUMMARY

In one example, the present disclosure describes a device, computer-readable medium, and method for regulating access to electronic entertainment to incentivize desired behavior. For instance, in one example, the behavior of an individual is monitored through data received from an electronic device. The behavior is compared to a predefined behavioral goal stored in a profile for the individual, and a predefined incentive associated with satisfaction of the predefined behavioral goal by the user is identified. The predefined incentive comprises access to an electronic entertainment medium. An instruction to the electronic entertainment medium is generated to grant access to the individual when it is determined that the individual has satisfied the predefined behavioral goal.

In another example, a device includes a processor and a computer-readable medium storing instructions which, when executed by the processor, cause the processor to perform operations. The operations include monitoring a behavior of an individual through data received from an electronic device, comparing the behavior to a predefined behavioral goal stored in a profile for the individual, identifying a predefined incentive associated with satisfaction of the predefined behavioral goal by the user, wherein the predefined incentive comprises access to an electronic entertainment medium, and generating an instruction to the electronic entertainment medium to grant access to the individual when it is determined that the individual has satisfied the predefined behavioral goal.

In another example, a non-transitory computer-readable storage medium stores instructions which, when executed by a processor, cause the processor to perform operations. The operations include monitoring a behavior of an individual through data received from an electronic device, comparing the behavior to a predefined behavioral goal stored in a profile for the individual, identifying a predefined incentive associated with satisfaction of the predefined behavioral goal by the user, wherein the predefined incentive comprises access to an electronic entertainment medium, and generating an instruction to the electronic entertainment medium to grant access to the individual when it is determined that the individual has satisfied the predefined behavioral goal.

BRIEF DESCRIPTION OF THE DRAWINGS

The teachings of the present disclosure can be readily understood by considering the following detailed description in conjunction with the accompanying drawings, in which:

FIG. 3A illustrates an example of a first graphical user interface that may be presented to a user;

FIG. 3B illustrates an example of a second graphical user interface that may be presented to a user;

To facilitate understanding, identical reference numerals have been used, where possible, to designate identical elements that are common to the figures.

DETAILED DESCRIPTION

In one example, the present disclosure regulates access to electronic entertainment to incentivize desired behavior. As discussed above, the World Health Organization estimates that the rates of obesity in children have tripled during the last twenty years. The Center for Disease Control lists sedentariness as a major contributing factor to this increase, and several studies have proposed a link between the increasing obesity rates and the usage of electronic devices such as smart phones, computers, video game systems, and televisions. In particular, increased access to electronic devices has been negatively correlated with decreased outdoor activity.

Examples of the present disclosure regulate access to electronic entertainment media (e.g., electronic devices and services that are accessible using electronic devices) to incentivize physical activity. For instance, examples of the present disclosure allow a parent or caregiver to set custom fitness goals (e.g., walk×number of steps, climb s stairs, run z miles at at least w miles per hour, etc.) for a child or other individual in their care that can be used to unlock access to electronic devices and services (e.g., n minutes of access to a digital video streaming service). In other words, when the child satisfies a particular predefined fitness goal, he or she may be rewarded with a predefined amount of access to his or her electronic devices and services. A centralized server may monitor various devices, including fitness trackers, connected vehicles, and other devices, in order to determine when the predefined fitness goal is met. The centralized server may also control and monitor the access to the electronic devices and services.

Although examples of the disclosure are discussed within the context of incentivizing target levels of physical activity, the same concepts may be applied to reward any other type of desired behavior that can be monitored. For instance, access to electronic entertainment could be tied to safe driving habits that can be monitored using a connected vehicle (e.g., if the user refrains from exceeding the speed limit, he or she may be rewarded with m minutes of access to a video game system). The same concepts could also be used to trigger an alert to an emergency responder when a particular health-related metric of the user crosses some predefined threshold (e.g., a fitness tracker indicates a heart rate in excess of y beats per minute, or a connected vehicle indicates that the user has been involved in an accident).

In one example, regulation of a user's access to electronic entertainment does not restrict access to emergency services (e.g., calls and alerts to a mobile phone, use of a connected vehicle to drive to the hospital, etc.).

Figure 1:
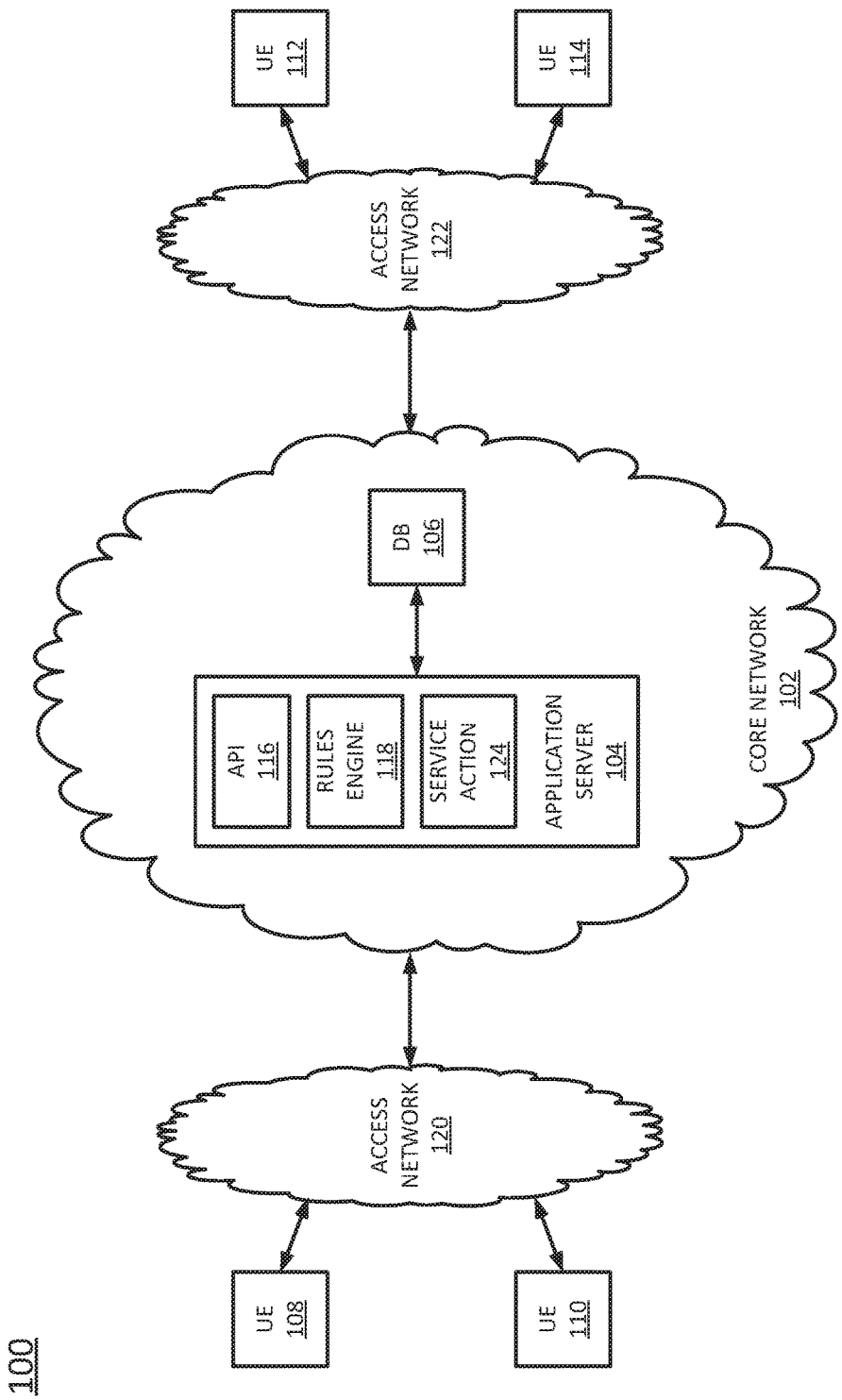
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114.

Figure 4:
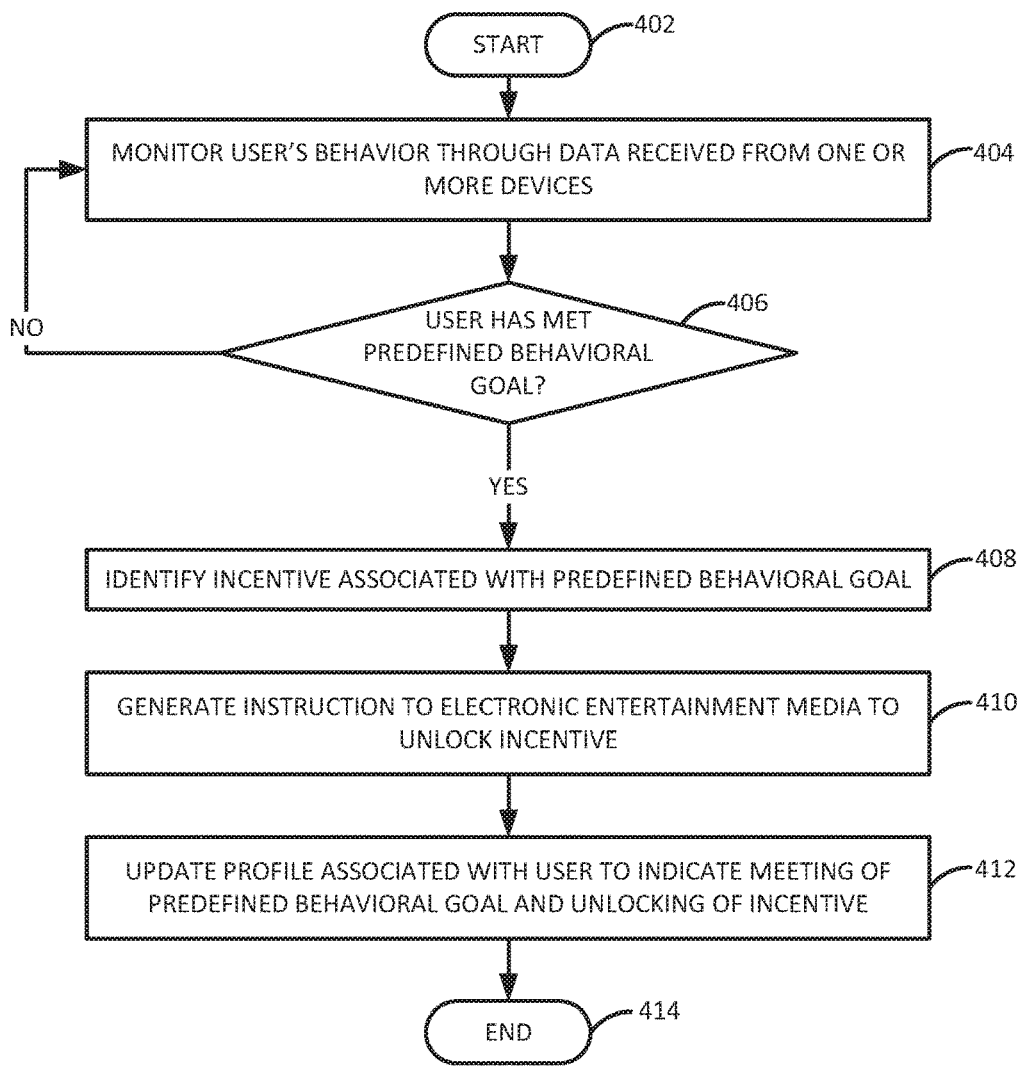
FIG. 4 illustrates a flowchart of a second example method for regulating access to electronic entertainment to incentivize desired behavior.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, a connected vehicle, and the like. In one example, at least some of the UEs 108, 110, 112, and 114 are configured to monitor metrics that help track a user's physical activity. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed. Any of the UEs 108, 110, 112, or 114 may comprise a general purpose computer that is configured to operate as a special purpose computer, as illustrated in FIG. 4 and discussed below. In one example, any of the UEs 108, 110, 112, or 114 may perform the methods discussed below related to regulating access to electronic devices and services.

In one example, the AS 104 may also or alternatively perform the methods discussed below related to regulating access to electronic devices and services. For instance, in one example, the AS 104 hosts an application that communicates with one or more of the UEs 108, 110, 112, and 114. As an example, the application may be a tracking application that monitors a user's physical activity (or other behavior) based on data captured by the UEs 108, 110, 112, and 114 and unlocks access to electronic entertainment (e.g., UEs 108, 110, 112, and 114 or services that can be accessed using the UEs 108, 110, 112, or 114) when the physical activity meets or exceeds a predefined threshold.

Figure 5:
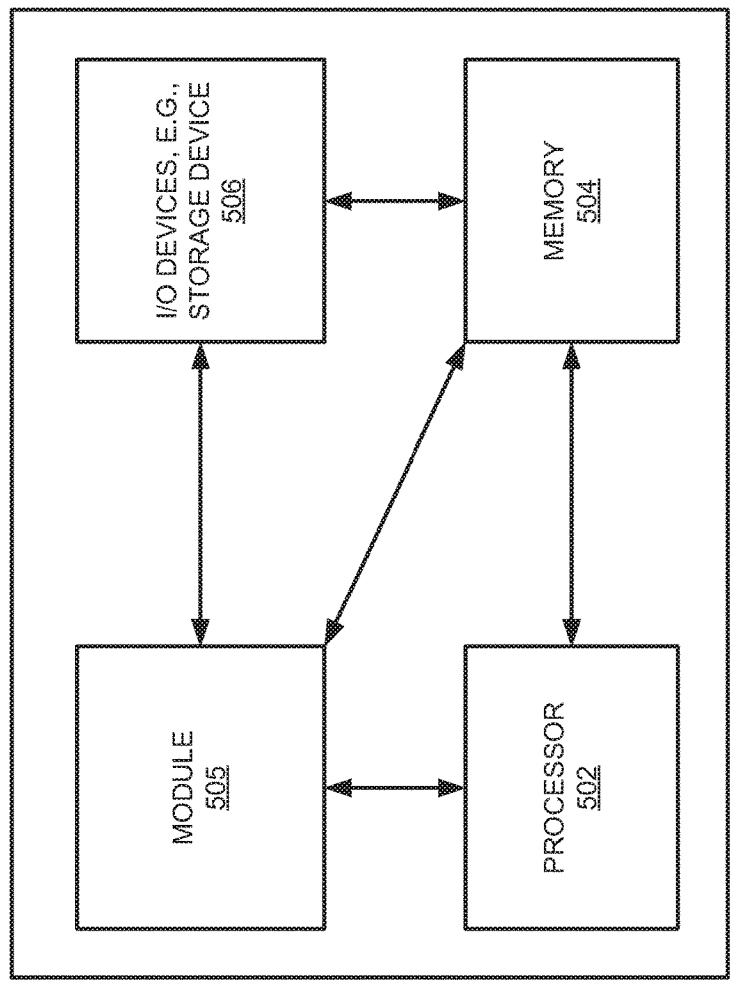
FIG. 5 depicts a high-level block diagram of a computing device specifically programmed to perform the functions described herein.

The AS 104 may comprise a general purpose computer as illustrated in FIG. 5 and discussed below. In one example, the AS 104 generally comprises an application programming interface/normalizer (API) 116, a rules engine 118, and a service action normalizer 124. The API 116 normalizes (i.e., matches to a common nomenclature) data collected from various sources in the network, including UEs 108, 110, 112, and 114. For instance, various sources may provide similar types of data, but may refer to the data using different nomenclature. Thus, normalization of the data allows the AS 104 to aggregate the data from different sources in order to better track a user's physical activity (or other behavior) and unlocked incentives. The rules engine 118 determines when a user's physical activity has met a predefined fitness goal and generates instructions to electronic entertainment media (e.g., an electronic device or a provider of a digital service that can be accessed using the electronic device) to provide access to a corresponding incentive or reward. The service action normalizer 124 is in communication with the rules engine 118 and maps the instructions generated by the rules engine 118 to formats that can be processed by the electronic entertainment to which the instruction is directed. For instance, different electronic devices and different digital entertainment services may use different formats to encode data.

In one example, the DB 106 may store profiles for individual users of electronic entertainment. The profile for a user may define one or more fitness goals for the user, as well as one or more incentives for meeting those fitness goals. For instance, a user's profile may specify that when the user walks×number of steps, he may be rewarded with n minutes of access to a digital video streaming service. The profile for a user may also store data provided by one or more of the UEs 108, 110, 112, and 114 that indicate the user's progress in meeting the fitness goals. For instance, the user profile may store data from a user's fitness tracker that indicates a number of steps walked by the user on a given day. The user profile may also include access information for one or more electronic devices or services, including account identifiers, passwords, and the like. In one example, a user's profile can be modified at any time to update the fitness goals and incentives, e.g., by the user himself, the user's parent or caregiver, or another individual. In a further example, several "child" user profiles may be accessible through a common "parent" profile that is authorized to make modifications to the child profiles. User profiles may be encrypted to protect sensitive data. In one example, the DB 106 may be implemented as a plurality of distributed database clusters.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
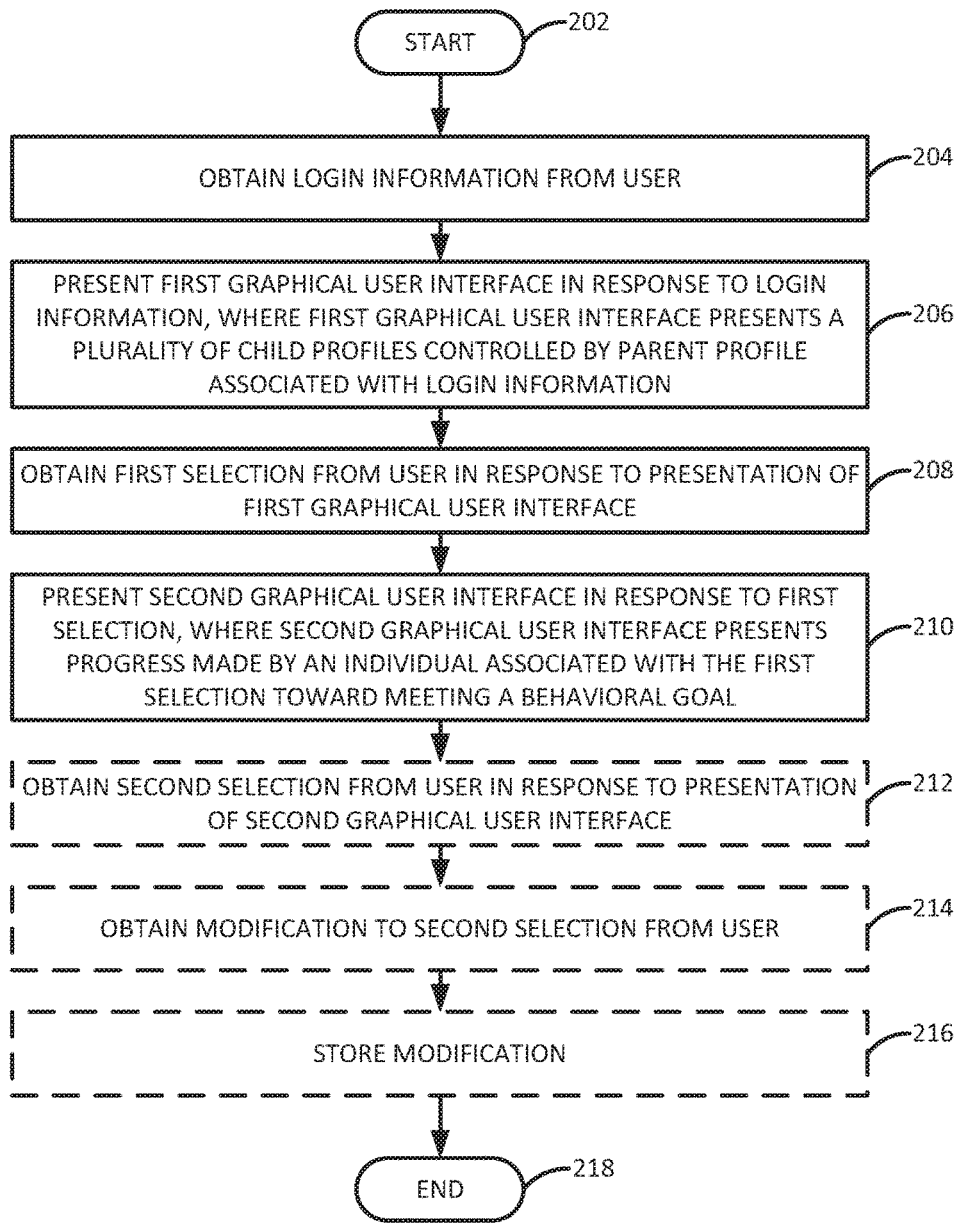
FIG. 2 illustrates a flowchart of a first example method for regulating access to electronic entertainment to incentivize desired behavior.

To further aid in understanding the present disclosure, FIG. 2 illustrates a flowchart of a first example method 200 for regulating access to electronic entertainment to incentivize desired behavior. In one example, at least some steps of the method 200 may be performed locally by a user endpoint device, such as one of the UEs 108, 110, 112, or 114 of FIG. 1, while other steps are performed by a remote application server, such as the AS 104. In another example, the method 200 could be performed entirely by an application server, such as AS 104, that accesses data from one or more user endpoint devices that track a user's physical activity. As such, any references in the discussion of the method 200 to the UEs 108, 110, 112, or 114 or to the AS 104 of FIG. 1 are not intended to limit the means by which the method 200 may be performed.

The method 200 begins in step 202. In step 204, login information is obtained from a user. For example, the user may provide a unique identifier and/or password, or other identifying information that allows one or more profiles associated with the user to be identified.

In step 206, a first graphical user interface is presented to the user in response to the login information. The graphical user interface may allow the user to view and select one of a plurality of profiles (e.g., child profiles) associated with the user for set up and/or modification. For instance, the user may be a parent who has several children, and each profile of the plurality of profiles may be associated with one of the children. FIG. 3A, for instance, illustrates an example of a first graphical user interface 300 that may be presented to a user. As illustrated, the graphical user interface 300 allows the user to select a child account that is associated with a parent account.

In step 208, a first selection is obtained from the user in response to the presentation of the first graphical user interface. The first selection identifies a profile (potentially one of a plurality of profiles, as noted above) that the user wishes to set up and/or modify.

In step 210, a second graphical user interface is presented to the user. The second graphical user interface may allow the user to view the behavioral goals (e.g., fitness goals) and associated incentives that have been set up for the selected profile. For instance, the user may be able to view the progress that has been made toward meeting the behavioral goals. The user may also be able to view incentives that have been unlocked, and how much of the unlocked incentives have been consumed (e.g., "k minutes of n unlocked minutes have been consumed"). FIG. 3B, for instance, illustrates an example of a second graphical user interface 302 that may be presented to a user. As illustrated, the graphical user interface 302 allows the user to see the progress made by the individual associated with a selected child account (e.g., to see the individual's physical activity progress for the day, progress towards meeting goals, incentives unlocked and consumed, etc.). In one example, a graphical user interface similar to the second graphical user interface could also be provided to a user who is associated with a "child" profile only (e.g., the person to whom the behavioral goals and incentives are directed). In this case, the second graphical user interface allows the user associated with the child profile to view his or her progress toward meeting the behavioral goals. The user may select the format in which the second user interface presents the information on the behavioral goal progress and unlocked incentives. For instance, the information could be presented as a pie chart, a bar graph, a numerical rate or percentage, or in another format.

In optional step 212 (illustrated in phantom), a second selection is obtained from the user in response to the presentation of the second graphical user interface. The second selection may identify a behavioral goal and/or associated incentive that the user wishes to modify.

In optional step 214 (illustrated in phantom), a modification to the second selection is obtained from the user. For instance, if the second selection identified a fitness goal of "walk×steps," which is associated with an incentive of "unlock n minutes of access to a digital video streaming service," then the modification may comprise an increase to the number of steps necessary to unlock the incentive. Alternatively, if the user determines, based on review of the second graphical user interface, that a user of the child program has been abusing the system (e.g., the physical activity indicated appears improbable, such as walking ten thousand steps in twenty minutes), the user may wish to revoke all currently unlocked incentives until further notice.

In optional step 216, the modification is stored in the user profile. The user profile may be stored in a database, such as the DB 106 of FIG. 1.

The method 200 ends in step 218.

In some examples, modifications may be made automatically (e.g., without an explicit user request) to one or more behavioral goals. For instance, if the AS 104 determines that a particular user is not attempting to meet more challenging behavioral goals (e.g., is meeting only relatively "easy" fitness goals), then the AS 104 may automatically make the behavioral goals more challenging. Alternatively, the AS 104 may gradually increase the difficulty of the behavioral goals as the user meets the behavioral goals. The AS 104 may also swap more popular incentives for fitness goals that the user achieves less frequently, so that the user is incentivized to achieve more "balanced" physical activity. Machine learning could be used to learn which fitness goals and rewards are more or less popular with a given user and to modify the associations between fitness goals and rewards accordingly.

FIG. 4 illustrates a flowchart of a second example method 400 for regulating access to electronic entertainment to incentivize desired behavior. In one example, at least some steps of the method 400 may be performed locally by a user endpoint device, such as one of the UEs 108, 110, 112, or 114 of FIG. 1, while other steps are performed by a remote application server, such as the AS 104. In another example, the method 400 could be performed entirely by an application server, such as AS 104, that accesses data from one or more user endpoint devices that track a user's physical activity. As such, any references in the discussion of the method 400 to the UEs 108, 110, 112, or 114 or to the AS 104 of FIG. 1 are not intended to limit the means by which the method 400 may be performed.

The method 400 begins in step 402. In step 404, a user's behavior (e.g., physical activity) is monitored through data received from one or more devices. For instance, the data may be received from the user's mobile phone, the user's wearable smart device (e.g., smart watch, smart heart rate monitor, smart pedometer, wearable fitness tracker, or the like), the user's connected vehicle, and/or another device. The user's behavior may be monitored in real or near-real time (e.g., subject to any network delays). Monitoring of the user's behavior may include normalizing the data received by the one or more devices (e.g., using the API 116 of FIG. 1) so that the data is matched to a common nomenclature that makes it easier to aggregate data from different sources.

In step 406, it is determined whether a predefined behavioral goal (e.g., fitness goal) has been met or satisfied by the user, based on the monitoring performed in step 404. This determination may be made by comparing the user's currently achieved behavior (as indicated by the monitoring) to the predefined behavioral goal (which may be identified in a user profile for the user, which may be retrieved from the DB 106). For instance, the rules engine 118 of FIG. 1 may determine, based on this comparison, that the user has met a fitness goal of "walk x steps."

If it is determined in step 406 that a predefined behavioral goal has not been met by the user, then the method 400 returns to step 404, and monitoring of the user's physical activity continues.

If, however, it is determined in step 406 that a predefined behavioral goal has been met by the user, then the method 400 proceeds to step 408. In step 408, an incentive associated with the predefined behavioral goal that was met is identified, based on the user profile. For instance, continuing the example above, the rules engine 118 may determine that when the user walks x steps, he or she is allowed to "access n minutes of a digital video streaming service."

In step 410, an instruction to an electronic entertainment medium (e.g., an electronic device or a provider of a service that is accessible via an electronic device) is generated, e.g., by the rules engine 118. For instance, continuing the example above, the rules engine 118 may generate an instruction to the provider of the digital video streaming service instructing the provider to grant or unlock n minutes of access for the user. In one example, generation of the instruction involves mapping the instruction to a format that can be processed by the electronic entertainment medium.

In step 412, the user profile is updated (e.g., by the API 116) to indicate that the user has achieved the predefined behavioral goal and unlocked the associated incentive. The update may further include indicating how much of the unlocked incentive has been consumed. In one example, an alert is received from the electronic entertainment medium when the unlocked incentive is accessed (e.g., when the user logs into an account with a digital video streaming service).

The method 400 ends in step 414.

Although not expressly specified above, one or more steps of the method 200 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 5 depicts a high-level block diagram of a computing device specifically programmed to perform the functions described herein. For example, any one or more components or devices illustrated in FIG. 1 or described in connection with the method 200 or the method 400 may be implemented as the system 500. For instance, a mobile device or an application server could be implemented as illustrated in FIG. 5.

As depicted in FIG. 5, the system 500 comprises a hardware processor element 502, a memory 504, a module 505 for regulating access to electronic entertainment, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for regulating access to electronic entertainment may include circuitry and/or logic for performing special purpose functions relating to monitoring a user's behavior relative to some predefined behavioral goal and unlocking access to an electronic entertainment medium upon satisfaction of the predefined behavioral goal. The input/output devices 506 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for regulating access to electronic entertainment (e.g., a software program comprising computer-executable instructions) can be loaded into memory 504 and executed by hardware processor element 502 to implement the steps, functions or operations as discussed above in connection with the example method 200 or the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for regulating access to electronic entertainment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
monitoring, by a processor deployed in a communication network, a behavior of an individual through data received from an electronic device associated with the individual;
comparing, by the processor, the behavior to a predefined behavioral goal stored in a profile for the individual, wherein the predefined behavioral goal comprises a safe driving habit;
identifying, by the processor, a predefined incentive associated with satisfaction of the predefined behavioral goal by the individual, wherein the predefined incentive comprises an access to an electronic entertainment medium, wherein the electronic entertainment medium is associated with a digital service that is accessible via the electronic device associated with the individual over the communication network, wherein the digital service comprises a data service or a video streaming service; and
transmitting, by the processor, an instruction to the electronic entertainment medium to grant the access to the individual when it is determined that the individual has satisfied the predefined behavioral goal, wherein the electronic entertainment medium is deployed in the communication network as a network-based service, wherein the electronic entertainment medium is distinct from the endpoint device associated with the individual.

2. The method of claim 1, wherein the predefined behavioral goal further comprises a target level of physical activity.

3. The method of claim 2, wherein the electronic device comprises a fitness tracker.

4. The method of claim 1, wherein the electronic device comprises a connected vehicle.

5. The method of claim 1, further comprising:
detecting when the behavior results in a predefined threshold being crossed for a health related metric, based on the comparing; and
triggering an alert to an emergency responder in response to the detecting.

6. The method of claim 1, wherein the monitoring comprises:
collecting the data from a plurality of sources including the electronic device; and
normalizing the data from the plurality of sources, such that the data from the plurality of sources matches a common nomenclature.

7. The method of claim 1, wherein the predefined behavioral goal and the predefined incentive are customizable.

8. The method of claim 7, wherein the predefined behavioral goal and the predefined incentive are customizable by a user other than the individual.

9. The method of 1, further comprising:
displaying a graphical user interface that illustrates a progress made by the individual toward satisfying the predefined behavioral goal.

10. The method of claim 9, wherein the graphical user interface further illustrates another predefined incentive that has already been granted to the individual.

11. The method of claim 10, wherein the graphical user interface further illustrates how much of the another predefined incentive that has already been granted to the individual has been consumed by the individual.

12. The method of claim 1, further comprising:
revoking another predefined incentive that has already been granted to the individual in response to a request from a user who has control over the profile.

13. The method of claim 1, further comprising:
automatically modifying the predefined behavioral goal, without an explicit instruction from a user who has control over the profile.

14. The method of claim 13, wherein the automatically modifying is performed in response to a determination that the individual is not attempting to satisfy one or more challenging behavioral goals.

15. The method of claim 14, wherein the automatically modifying comprises changing another predefined incentive that is associated with satisfaction of at least one goal of the one or more challenging behavioral goals.

16. A device, comprising:
a processor deployed in a communication network; and
a computer-readable medium storing instructions which, when executed by the processor, cause the processor to perform operations, the operations comprising:
monitoring a behavior of an individual through data received from an electronic device associated with the individual;
comparing the behavior to a predefined behavioral goal stored in a profile for the individual, wherein the predefined behavioral goal comprises a safe driving habit;
identifying a predefined incentive associated with satisfaction of the predefined behavioral goal by the individual, wherein the predefined incentive comprises an access to an electronic entertainment medium, wherein the electronic entertainment medium is associated with a digital service that is accessible via the electronic device associated with the individual over the communication network, wherein the digital service comprises a data service or a video streaming service; and
transmitting an instruction to the electronic entertainment medium to grant the access to the individual when it is determined that the individual has satisfied the predefined behavioral goal, wherein the electronic entertainment medium is deployed in the communication network as a network-based service, wherein the electronic entertainment medium is distinct from the endpoint device associated with the individual.

17. A non-transitory computer-readable storage medium storing instructions which, when executed by a processor deployed in a communication network, cause the processor to perform operations, the operations comprising:
monitoring a behavior of an individual through data received from an electronic device associated with the individual;
comparing the behavior to a predefined behavioral goal stored in a profile for the individual, wherein the predefined behavioral goal comprises a safe driving habit;
identifying a predefined incentive associated with satisfaction of the predefined behavioral goal by the individual, wherein the predefined incentive comprises an access to an electronic entertainment medium, wherein the electronic entertainment medium is associated with a digital service that is accessible via the electronic device associated with the individual over the communication network, wherein the digital service comprises a data service or a video streaming service; and
transmitting an instruction to the electronic entertainment medium to grant the access to the individual when it is determined that the individual has satisfied the predefined behavioral goal, wherein the electronic entertainment medium is deployed in the communication network as a network-based service, wherein the electronic entertainment medium is distinct from the endpoint device associated with the individual.

18. The non-transitory computer-readable storage medium of claim 17, wherein the predefined behavioral goal further comprises a target level of physical activity.

19. The non-transitory computer-readable storage medium of claim 18, wherein the electronic device comprises a fitness tracker.

20. The non-transitory computer-readable storage medium of claim 17, wherein the electronic device comprises a connected vehicle.

* * * * *